US010799911B2

(12) United States Patent
Hall et al.

(10) Patent No.: US 10,799,911 B2
(45) Date of Patent: Oct. 13, 2020

(54) ELECTRON BEAM CURABLE INKJET FORMULATION WITH IMPROVED ADHESION

(71) Applicant: SUN CHEMICAL CORPORATION, Parsippany, NJ (US)

(72) Inventors: Stephen Anthony Hall, Wells (GB); Derek Ronald Illsley, Bath (GB)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 54 days.

(21) Appl. No.: 16/091,386

(22) PCT Filed: Apr. 10, 2017

(86) PCT No.: PCT/US2017/026749
§ 371 (c)(1),
(2) Date: Oct. 4, 2018

(87) PCT Pub. No.: WO2017/180491
PCT Pub. Date: Oct. 19, 2017

(65) Prior Publication Data
US 2019/0337305 A1 Nov. 7, 2019

Related U.S. Application Data

(60) Provisional application No. 62/320,640, filed on Apr. 11, 2016, provisional application No. 62/320,657, filed on Apr. 11, 2016, provisional application No. 62/449,168, filed on Jan. 23, 2017.

(51) Int. Cl.
B41J 11/00 (2006.01)
B05D 3/02 (2006.01)
B05D 3/06 (2006.01)
C09D 11/101 (2014.01)
C09D 11/30 (2014.01)
B41M 5/00 (2006.01)
C09D 11/32 (2014.01)
C09D 11/36 (2014.01)
C09D 11/38 (2014.01)

(52) U.S. Cl.
CPC ........... B05D 3/0209 (2013.01); B05D 3/067 (2013.01); B05D 3/068 (2013.01); B41J 11/002 (2013.01); B41M 5/0023 (2013.01); C09D 11/101 (2013.01); C09D 11/30 (2013.01); C09D 11/32 (2013.01); C09D 11/36 (2013.01); C09D 11/38 (2013.01); B05D 2502/00 (2013.01); B05D 2506/25 (2013.01); B05D 2508/00 (2013.01); B05D 2518/00 (2013.01)

(58) Field of Classification Search
CPC ..... B41J 11/002; B41M 5/0023; C09D 11/30; C09D 11/101
See application file for complete search history.

(56) References Cited

U.S. PATENT DOCUMENTS

| 5,260,349 | A | | 11/1993 | Crivello |
| 5,407,708 | A | | 4/1995 | Lovin et al. |
| 5,527,578 | A | * | 6/1996 | Mazurek ............. C08F 290/068 427/387 |
| 5,587,405 | A | * | 12/1996 | Tanaka ..................... B41M 1/30 106/31.43 |
| 6,429,235 | B1 | | 8/2002 | Varlemann |
| 6,569,500 | B1 | | 5/2003 | Sigel et al. |
| 6,730,363 | B1 | | 5/2004 | Shah et al. |
| 7,270,408 | B2 | | 9/2007 | Odell et al. |
| 8,476,334 | B2 | | 7/2013 | Illsley et al. |
| 2003/0211299 | A1 | | 11/2003 | Rajan |
| 2007/0027239 | A1 | | 2/2007 | Weber et al. |
| 2007/0087131 | A1 | | 4/2007 | Hutchinson |
| 2008/0018695 | A1 | | 1/2008 | Kadomatsu et al. |
| 2008/0090018 | A1 | | 4/2008 | Inaba |
| 2009/0074982 | A1 | | 3/2009 | Nakamura |
| 2009/0207198 | A1 | | 8/2009 | Muraoka |
| 2010/0313782 | A1 | | 12/2010 | Loccufier |
| 2011/0046257 | A1 | | 2/2011 | Webster |
| 2014/0378561 | A1 | | 12/2014 | Van Berchum et al. |
| 2015/0225585 | A1 | | 8/2015 | De Rossi et al. |

FOREIGN PATENT DOCUMENTS

| EP | 0 588 533 A2 | 3/1994 |
| EP | 1 829 902 A1 | 9/2007 |
| EP | 2 233 540 A1 | 9/2010 |

(Continued)

OTHER PUBLICATIONS

European Search Report issued in counterpart EP application No. 17 78 2901 dated Oct. 30, 2019.
U.S. Appl. No. 16/091,869, filed Oct. 5, 2018.
U.S. Appl. No. 16/092,045, filed Oct. 8, 2018.
International Search Report issued in International Application No. PCT/US2017/026755 dated Jun. 27, 2017.
Written Opinion of the International Searching Authority issued in International Application No. PCT/US2017/026755 dated Jun. 27, 2017.
International Search Report issued in International Application No. PCT/US2017/026757 dated Jul. 6, 2017.
Written Opinion of the International Searching Authority issued in International Application No. PCT/US2017/026757 dated Jul. 6, 2017.
International Preliminary Examination Report issued in PCT/US2017/026757, dated Oct. 16, 2018.

(Continued)

Primary Examiner — Henok D Legesse
(74) Attorney, Agent, or Firm — Charles C. Achkar; Ostrolenk Faber LLP

(57) ABSTRACT

The present invention provides a method for printing energy curable ink and coating compositions that comprise high amounts of multifunctional monomers, achieving cured inks and coatings that exhibit good adhesion to plastic substrates, good resistance when cured, and low amounts of uncured, migratable monomers. The method of the present invention employs electron beam curing of the ink and coating compositions, at accelerating voltages greater than or equal to 70 keV, and electron beam doses greater than or equal to 30 kGy, and preferably greater than or equal to 40 kGy.

19 Claims, No Drawings

(56) References Cited

FOREIGN PATENT DOCUMENTS

| | | |
|---|---|---|
| IN | 3549CHN2009 A | 9/2015 |
| JP | 2003276178 A | 9/2003 |
| JP | 2003320744 A | 11/2003 |
| JP | 2003320746 A | 11/2003 |
| JP | 2004058566 A | 2/2004 |
| JP | 2004098309 A | 4/2004 |
| JP | 2004338100 A | 12/2004 |
| JP | 2005126509 A | 5/2005 |
| JP | 2006001226 A | 1/2006 |
| JP | 2010023488 A | 2/2010 |
| JP | 2016/180072 A | 10/2016 |
| WO | WO 94/22596 A1 | 10/1994 |
| WO | WO 2014/063997 A1 | 5/2014 |
| WO | WO 2014/126720 A1 | 8/2014 |
| WO | WO 2015/049873 A1 | 4/2015 |
| WO | WO 2015/148094 A1 | 10/2015 |
| WO | WO 2016/164220 A1 | 10/2016 |
| WO | WO 2016/186838 A1 | 11/2016 |

OTHER PUBLICATIONS

International Preliminary Examination Report issued in PCT/US2017/026755, dated Oct. 16, 2018.
International Search Report issued in International Application No. PCT/US2017/026749 dated June 27, 2017.
Written Opinion of the International Searching Authority issued in International Application No. PCT/US2017/026749 dated June 27, 2017.
International Preliminary Report issued in PCT/US2017/026749 dated Oct. 16, 2018.
Merck KGaA, Darmstadt Germany and/or its affiliates. Millipore Sigma. Periodic Table of Elements. (Year: 2019).
Office Action issued in related application U.S. Appl. No. 16/092,045 dated Oct. 28, 2019.
Office Action issued in related application U.S. Appl. No. 16/091,869 dated Oct. 2, 2019.
Office Action issued in related application U.S. Appl. No. 16/091,869 dated Feb. 27, 2020.

\* cited by examiner

ELECTRON BEAM CURABLE INKJET FORMULATION WITH IMPROVED ADHESION

CROSS REFERENCE TO RELATED APPLICATIONS

The present application is a § 371 National Stage application based on PCT/US2017/026749 filed Apr. 10, 2017, which claims the benefit of U.S. Provisional Application No. 62/320,640 filed Apr. 11, 2016, U.S. Provisional Application No. 62/320,657 filed Apr. 11, 2016, and U.S. Provisional Application No. 62/449,168 filed Jan. 23, 2017, the subject matter of each of which is hereby incorporated by reference in its entirety.

FIELD OF THE INVENTION

The present invention is related to a method for printing energy curable ink and coating compositions that comprise high amounts of multifunctional monomers, achieving cured inks that exhibit good adhesion to plastic substrates, good resistance when cured, and low amounts of uncured, migratable monomers. The method of the present invention employs electron beam curing of the ink and coating compositions, using high doses of electron beam radiation.

BACKGROUND

Ultraviolet light (UV) reactive inkjet printing has become well known as a reliable printing method for graphic display and single pass applications, such as printing onto labels. More recently, by careful selection of raw materials, energy curable low migration inks and coatings have been produced. Within the market area of food packaging, single pass energy curing inkjet can be used where short runs are required, or there are advantages in eliminating time taken for image changeover; or to avoid the need to hold printed stock ("point of fill" printing). Thus, the overall print cost can be lower than conventional flexography or gravure printing. After printing, there is a cure stage, where photoinitiators (PI's) interact with UV light to form free-radicals which then react with double bonds in the acrylate monomers to initiate free radical polymerization, creating a colored image polymeric coating.

In an electron beam curing unit, electrons are produced from a filament, then accelerated through a vacuum, and passed through a foil window to exit the generation area. The beam then travels across a gap before passing into an ink layer on the carrying substrate. Here, the electrons may generate a free radical. Lead shielding is present to trap X-rays which may also be generated. The presence of oxygen above and in the film can consume the radicals created, therefore a layer of inert gas, usually nitrogen, is typically present in the curing area of the machine. This replaces the oxygen, and prevents the radicals being quenched.

The energy of a typical UV photon, particularly in the UVA and UVB regions of the UV spectrum, is below the chemical bond energy of acrylate monomers, meaning that the curing reaction cannot be initiated without the presence of a photoinitiator (PI). As the energy of electron beam (EB) electrons exceeds the bond energy of acrylate monomers, they can initiate cure without added PI. Problems of migration, taint, and odour associated with uncured photoinitiator and photoinitiator fragments are then eliminated. With EB curing, the relationship between the crosslink density and the resultant adhesion and chemical resistance will be altered compared to cure by ultraviolet light, which can give significant advantages.

IN3549CHN2009 discloses a method of producing printed 3-D objects by printing a mixture of two or more fluids by inkjet onto a support, at least partially curing the jetted mixture by actinic radiation or electron beam, and repeating the procedure to produce multiple layers of inks. The process builds a 3-D relief on the support.

US 2015/0225585 discloses solvent based inkjet inks that comprise at least two solvents, each having differing evaporation rates. The inkjet inks are free from photoinitiators and are electron beam curable.

JP 2010-023488 describes glass plates printed with UV inkjet inks which are then overprinted with an electron beam cured clear overcoating. The layers are composed of different ink formulations, and are cured separately.

US 2009/0207198 provides an offset printing method that uses an inkjet system to print a UV ink onto a flat original plate, irradiating the printed image with UV or electron beam radiation to bring the ink into a semi-dried state, and then transferring the semi-dried ink image to a surface of an elastic blanket, and offset printing the ink image transferred to the elastic blanket onto a product. The offset printed ink image is then dried and fixed on the product.

US 2008/0018695 provides a recording apparatus that forms an image on a recording medium by printing two liquids, one of which is printed on top of the other, and then irradiating the liquids by irradiating with electron beam radiation. The electron beam device radiates the electron beam at an accelerating voltage of 40 kV to 60 kV.

JP 2006-001226 describes a method of manufacturing an inkjet recording material wherein a substrate is coated with an aqueous solution containing a polymer with an acetoacetyl group, and at least inorganic particulates. The aqueous solution is irradiated with an electron beam before drying.

JP 2005-126509 discloses an ink for inkjet printing that contains at least an oil-gelling agent and an electron beam curable composition.

JP 2004-338100 describes a coating layer that is composed of a water based paint that contains no radically polymerizable unsaturated bonds that forms a hydrogel when irradiated by electron beam. The coating layer is subsequently overprinted with a glossy layer.

JP 2004-098309 discloses an electron beam curable inkjet ink for printing onto metal coated plates that is cured efficiently under low accelerating voltage. The accelerating voltage is set to be no more than 150 kV.

JP 2003-320746 describes an inkjet receiving layer with improved adhesion on the support, wherein one of the coating layers comprises an aqueous paint that includes an electron beam curing component. Irradiation of the aqueous paint with the electron beam forms a hydrogel.

JP 2003-320744 discloses an inkjet recording body that is formed by coating a base material with an aqueous paint that includes an electron beam curing component. The coating layer forms a hydrogel when irradiated with electron beam radiation.

JP 2003-276178 discloses a radiation curable inkjet ink that can be cured, or the viscosity increased, by irradiating with visible light, UV, EB or IR radiation. No advantages of one type of radiation as opposed to the others are described.

It is generally believed, particularly in the case of plastic substrates, that in order to improve resistance (e.g. scratch, chemical, solvent) of an energy cured ink or coating, the energy curable ink or coating composition must contain significant amounts of multifunctional monomers. Increasing the amount of multifunctional monomers also generally reduces the amount of migratable uncured monomer out of the cured coating. However, as the amount of multifunctional monomers in an ink or coating composition is increased, there is a concomitant loss of adhesion. It is generally believed that it is necessary to include significant amounts of monofunctional monomers to achieve adequate adhesion to the substrate. However, increasing the amount of monofunctional monomers results in a concomitant loss of resistance, and increase of uncured migratable monomers out of the cured coating.

In addition, it is generally believed that high doses of EB radiation are likely to damage substrates, such as plastic substrates. Thus, in applications where EB radiation is used, the EB dose is typically kept low, usually below 30 kGy. It would therefore not be expected that, due to the presumed detrimental effects on the substrate, using high doses of EB radiation to achieve good adhesion and good resistance would be successful.

Thus, there remains a need in the art for energy curable ink and coating compositions that adhere well to the substrate, have good resistance when cured, and low levels of uncured migratable monomers.

SUMMARY OF THE INVENTION

The present invention provides a method of printing an energy curable ink or coating composition having both good adhesion and good resistance, for example, solvent resistance. In addition, the cured inks and coatings have a low migration potential of uncured monomers. The method can be used with ink and coating compositions that, under conventional printing parameters, have good resistance, but poor adhesion to the substrate.

In a particular aspect, the present invention provides a method for printing an energy curable ink or coating composition comprising:
a) providing an energy curable ink or coating composition, wherein the energy curable ink or coating composition comprises:
  i) greater than or equal to 20% (w/w) one or more multifunctional polymerizable monomers, based on the total weight of the ink or coating composition;
  ii) optionally, one or more solvents; and
  iii) optionally, one or more colorants;
b) applying the energy curable ink or coating composition of step a) to a substrate;
c) curing the applied energy curable ink or coating composition by electron beam radiation, wherein:
  i) the accelerating voltage of the electron beam emitter is greater than or equal to 70 keV; and
  ii) the cure dose is greater than or equal to 30 kGy.

In another aspect, the present invention provides a printed article prepared by the method of the present invention.

In another aspect, the present invention provides a method of reducing the amount of migratable monomer in a cured ink or coating using the printing method of the present invention.

In another aspect, the present invention provides a method for preparing an article with a low migration ink or coating thereon using the printing method of the present invention.

Other features of the present invention are described in more detail below.

DETAILED DESCRIPTION OF THE INVENTION

It is to be understood that the foregoing general description and the following detailed description are exemplary and explanatory only, and are not restrictive of any subject matter claimed.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

A problem that has not been adequately addressed in the prior art is how to achieve good adhesion of an energy curable ink or coating composition to a substrate, particularly a plastic substrate, while still maintaining good resistance by including high amounts of multifunctional monomers in the composition.

In a particular aspect, the present invention provides a method for printing an energy curable ink or coating composition comprising:
a) providing an energy curable ink or coating composition, wherein the energy curable ink or coating composition comprises:
  i) greater than or equal to 20% (w/w) one or more multifunctional polymerizable monomers, based on the total weight of the ink or coating composition;
  ii) optionally, one or more solvents; and
  iii) optionally, one or more colorants;
b) applying the energy curable ink or coating composition of step a) to a substrate;
c) curing the applied energy curable ink or coating composition by electron beam radiation, wherein:
  i) the accelerating voltage of the electron beam emitter is greater than or equal to 70 keV; and
  ii) the cure dose is greater than or equal to 30 kGy.

The present invention is the first time that it has been shown that using EB doses of greater than or equal to 30 kGy, and preferably greater than or equal to 40 kGy, improves the adhesion of predominantly multifunctional inks to various plastic surfaces. Indeed, for the curing of analog inks such as flexographic and offset inks it is a commonly accepted practice to employ doses of less than or equal to 30 kGy. There are a number of reasons for this, including the high press speeds now required of these technologies (which implicitly limits the maximum achievable dose), and also concerns over the impact that higher doses may have on the physical properties of the substrate. It should be stated here that the inventors have not observed any degradation of the properties of the plastic used in their investigations with EB doses greater than or equal to 30 kGy. Thus, the present invention is drawn to a method of providing a cured ink or coating comprising using electron beam ionization irradiation with an accelerating voltage of greater than or equal to 70 keV, preferably greater than or equal to 80 keV, and a dose greater than or equal to 30 kGy, and preferably wherein the ink or coating contains greater than or equal to 20% (w/w) of any blend of multifunctional monomer (s), and more preferably greater than or equal to 50% (w/w) of any blend of multifunctional monomer(s).

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth) acrylic acid" include both acrylate and methacrylate compounds, and both acrylic acid and methacrylic acid.

As used herein, "monofunctional" means having one functional group.

As used herein, "multifunctional" means having two or more functional groups. A multifunctional monomer, for e.g., can be a di-functional, tri-functional, tetra-functional or have a higher number of functional groups. The two or more functional groups can be the same or different.

As used herein, a "multifunctional ink or coating" composition is one which comprises greater than or equal to 5% (w/w) of one or more multifunctional monomers.

As used herein, the terms "monomer" or "monomers" are intended to include both monomers and oligomers, or mixtures thereof.

As used herein, the terms "inks and coatings," "inks," "compositions" and "fluids" are used interchangeably.

As used herein, "energy-curing" refers to the cure achieved under exposure to various electromagnetic radiation sources producing an actinic effect. Such sources include but are not limited to, electron-beam, UV-light, visible-light, IR, or microwave. Where the compositions are cured under the action of UV light, then non-limiting UV sources such as the following can be used: low pressure mercury bulbs, medium pressure mercury bulbs, a xenon bulb, excimer lamps, a carbon arc lamp, a metal halide bulb, a UV-LED lamp or sunlight. It should be appreciated by those skilled in the art that any UV light source, or other source of actinic radiation, may be used to cure compositions prepared according to the current invention. Compositions of the current invention are especially suited for use in compositions curable under the action of UV light and/or electron-beam.

As used herein, "low migration" refers to the level of contamination of any packaged produce or product being less than 50 parts per billion (ppb) of any particular uncured monomer that may leach out of the ink or coating once it is cured on the substrate. 'Low migration' further means that contamination by photoinitiator residues should also be less than 50 ppb, or less than the specific migration limit (SML) existing for any specific photoinitiator. The methods of the current invention lend themselves to applications where higher conversion of monomer via energy curing is preferable. Such applications include the printing of food packaging, pharmaceutical packaging, personal care and household packaging, display boards in supermarkets, etc. In all these applications it is advantageous that the energy-cured ink, or coating, contains minimal amounts of uncured material that could leach ('migrate') out of the ink into the surrounding environment thereby causing unwanted contamination. This is of particular concern for food packaging where any contamination of the packaged food from undesirable, migratable, ink components should be minimized. Therefore, any means to increase the conversion of such low molecular weight, low functionality monomers, during energy curing would be advantageous for the aforementioned sensitive printing applications. This is achieved by the methods of printing energy curable ink and coating compositions according to the current invention.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

Throughout this disclosure, all parts and percentages are by weight (wt % or mass % based on the total weight) and all temperatures are in ° C. unless otherwise indicated.

Electron Beam Curable Ink and Coating Compositions and Method of Printing

The invention is especially directed to EB-curable inkjet fluids, but also encompasses other types of printing inks and coatings, such as flexographic inks and coatings. In the case of energy-curable inkjet fluids it is the common practice to use polymerizable components which consist predominantly of a blend of monofunctional monomers to achieve adhesion to a range of plastic substrates, such as vinyl, acrylic, polystyrene, polycarbonate, polyester, polyolefin, polyamide, etc. Monofunctional monomers, such as N-vinylcaprolactam and ethylene glycol phenyl ether acrylate are used to promote the adhesion of cured inks to plastic surfaces. The adhesion performance associated with the use of such monofunctional monomers is held to arise from their high solvency power for the plastic substrate. Indeed, the inventors have found, through studies not associated with the current invention, that in cured inks comprising such monomers a small portion remains uncured. This uncured monomer component persists in the cured ink to aid adhesion in two possible ways; firstly, by solvating the plastic substrate as previously described and also by acting as a potential plasticising solvent for the cured ink itself. A further aspect of the use of predominantly monofunctional inks in achieving adhesion to plastic films is that they produce largely non-crosslinked networks and lower degrees of shrinkage during cure than do inks comprising significant concentrations of multifunctional monomers. These issues of adhesion are particularly pertinent to inkjet printing where ink film thicknesses in excess of 10 microns are commonly deposited during the printing process. It is part of the state-of-the art knowledge that the adhesion of cured inks can decrease as the ink film thickness increases. Thus, for these aforementioned reasons, amongst others (such as viscosity reduction), inkjet fluids often comprise largely of monofunctional monomers to achieve the desired adhesion to a broad range of plastic substrates.

However, inkjet fluids that comprise predominantly monofunctional monomers tend to produce cured ink films having poor solvent resistance. This is, in part, due to the linear non-crosslinked nature of the cured ink film, which can be readily dissolved by organic solvents. To achieve improved resistance properties, as well as improved toughness, abrasion resistance, scratch resistance, etc., multifunctional monomers are introduced to the inkjet compositions which enable crosslinking of the ink during the energy-curing process. However, the incorporation of significant concentrations of multifunctional monomers into an inkjet composition generally has a deleterious effect on the adhesion to plastic substrates.

A further and most significant disadvantage of inks comprising monofunctional monomers is that after cure, significant concentrations of uncured (and therefore unbound) such monomers persist in the ink which may then contaminate the surrounding environment. This is a particular concern for sensitive printing applications, such as the printing of food packaging, pharmaceutical packaging, personal care packaging, etc. For this reason inkjet inks intended for the printing of such applications should consist predominantly of multifunctional monomers in combination with suitable low migration potential photoinitiators. However, it should be understood from the previous discussion that the adhesion of such inks on plastic surfaces may be deficient.

Therefore, it would be advantageous to combine the adhesive performance of a monofunctional ink with the resistance and low migration potential properties of a multifunctional ink. The inventors have surprisingly found that inks comprising multifunctional monomers and those ink compositions which consist entirely of multifunctional monomers can be made to adhere to a wide range of plastic surfaces by curing under the action of electron beam radiation, where the total dose is greater than or equal to 30 kGy, and preferably greater than or equal to 40 kGy. The inventors do not wish to be bound to any particular theory as to why this is the case, but postulate that a potential reason for the improved adhesion performance is due to reactive grafting between the plastic substrate and ink. It is envisaged that under the influence of EB doses specified by the current invention free radicals are created at the substrate surface, which can then act as initiating sites for polymerisation of the monomers contained within the ink. Thus, the ink would become covalently bound to the plastic substrate resulting in improved adhesion of the ink to the plastic surface.

A multifunctional ink or coating, and most especially one which is suitable for inkjet application in the context of the current invention, can be defined as one which comprises greater than or equal to 5% (w/w) of multifunctional monomer(s), based on the total weight of the ink or coating composition. It is preferable that the ink or coating comprises greater than or equal to 20% of any blend of multifunctional monomer(s), and more preferably greater than or equal to 50% of any blend of multifunctional monomer(s). In one preferred embodiment the ink or coating would comprise only multifunctional monomer(s), and thus would be free of monofunctional monomers. However, the use of monofunctional monomer(s) in virtually any amount would be possible as long as the % of multifunctional monomer(s) is preferably greater than or equal to 20%, more preferably greater than or equal to 50%. A multifunctional monomer is one which comprises two or more free radically polymerizable groups. Any free radically polymerizable group is encompassed by the invention and can include any blend of the following, non-limiting, types: acrylate, methacrylate, alkene, acrylamide, vinyl ether, propenyl ether, maleate. Acrylate monomers are especially preferred.

The inventors' finding that multifunctional inkjet fluids can be cured under the action of electron beam with doses of greater than or equal to 30 kGy and deliver excellent adhesion to various plastic surfaces is the first time that this has been demonstrated.

The most likely application for the process and compositions of the current invention is in the single pass inkjet printing of plastic films, such as narrow web printing of labels and flexible packaging. Where food packaging is to be printed, it is preferred that the concentration of any blend of monofunctional monomer should be less than 5%. As a further aspect of the invention, photoinitiators may be included in the ink to enable the UV-pinning of the inks prior to EB-curing.

It should be understood that photoinitiators may form an optional part of compositions of the current invention, as they are not required as part of the EB initiation process. However, they can be included for instances where the inks, or coatings, need to be 'pinned' prior to the EB-curing stage. 'Pinning' is a recognized term in the industry and refers to any process where an inkjet print after deposition from the printhead is subjected to a process that increases the viscosity of the ink sufficiently to prevent its spreading (dot gain) and to improve the holdout of inks overprinted onto it to mitigate against ink bleed. Without pinning, a loss of print quality can ensue from the processes of excessive dot gain and ink bleed. An appropriate means of pinning an inkjet ink or coating prior to the final EB-curing stage is to partially cure the ink via a UV-pinning process. To enable this it is preferable that low concentrations of any blend of photoinitiators may be included in any composition according to the current invention. There is no limit on the concentration of the photoinitiator component of compositions of the current invention. However, as photoinitiators are known to attenuate the electron beam curing, it is preferred that the total concentration of photoinitiators is below 5% (w/w) of the total composition, preferably less than 3% (w/w) and more preferably less than 1% (w/w). When ink and coating compositions of the current invention are pinned under the action of UV-light, any UV-light source producing an actinic effect can be used. A non-limiting list of potential UV light sources includes, but is not limited to, medium pressure mercury lamps, low pressure mercury lamps, UV-LED, UVC lamps, xenon lamps, and daylight. A particularly preferred photoinitiator class for the UV-pinning of inks and coatings of the current invention are the acylphosphine oxide type.

Where the inks are to be printed onto substrates which will subsequently form part of food packaging, pharmaceutical packaging or other sensitive applications, it is preferred that those photoinitiators having recognized low migration potential be used. Low migration photoinitiators include polymeric, polymerizable and multifunctional types. The fact that no, or very little, photoinitiator is preferred in the inks of the current invention cured at doses of greater than or equal to 30 kGy, is beneficial for applications requiring low migration, such as the printing of food packaging. Photoinitiators and residues thereof can pose a significant risk to the unwanted contamination of sensitive produce, such as foods, drugs, etc.

Where the inks of the current invention are to be used in the printing of food packaging and other sensitive applications, the inventors have found that highly ethoxylated monomers as revealed in WO2015/148094 are particularly effective in achieving high degrees of monomer conversion and are therefore incorporated as an aspect of the current invention. WO2015/148094 claimed inks comprising hydroxyl-ketone type photoinitiators as part of the composition. The inventors have found that such photoinitiators have poor pinning performance, especially under the action of a UV-LED light source, whereas acyl phosphine oxide type photoinitiators are effective in pinning inks of the current invention, at concentrations of less than 1.0%. It is therefore, a further aspect of the current invention that inks may optionally comprise acylphosphine oxide photoinitiators at concentrations of less than 1.0%.

Inks formulated using monofunctional acrylates produce softer coatings, with reduced solvent resistance but with good adhesion profiles when compared to those formulated using multifunctional acrylates. If the crosslink density is increased, then the coating will become harder, but shrinkage will occur and the adhesion will be reduced. Use of higher amounts of multifunctional monomers in ink and coating compositions produces harder coatings, but adhesion is usually compromised. We have found that we can maintain the adhesion if ink and coating compositions comprising high amounts of multifunctional monomers are cured using electron beam ionization irradiation with an accelerating voltage greater than or equal to 80 keV and a dose greater than or equal to 30 kGy.

Monomers play a major role in determining the physical properties of a radiation curable inkjet formulation and the resulting film. Regardless of their chemical structure, they always require at least one polymerizable group. In the case of curing by a free-radical polymerization mechanism, which can be initiated by electron beam ionization radiation or via radical-generating photoinitiators, the polymerizable groups are in general carbon-carbon double bonds. The most important radically curable monomers used in inkjet inks contain acrylate or, less frequently, methacrylate groups. The monomers are usually derived from monoalcohols, diols, or polyols, that are sometimes alkoxylated, which are usually esterified with either acrylic or methacrylic acid. The functionality, i.e., the number of polymerizable groups per molecule, is of major importance to the final performance of the inkjet ink. Formulations containing monomers with one polymerizable group will produce a linear polymer structure while those with two or more polymerizable groups will give rise to crosslinked polymer structures. As the crosslink density increases so will the hardness, and chemical and scratch resistance, but a resultant loss of adhesion often occurs. The crosslink density depends upon the average number of polymerizable groups per molecule of the monomer (i.e. the functionality) and the molecular weight between two crosslinks. The functionality normally lies between one and six for acrylate monomers with either one or two polymerizable groups being preferred for the formulation of free radically cured inkjet inks.

The ink and coating compositions of present invention preferably comprise greater than or equal to 20% (w/w) one or multifunctional monomers, based on the total weight of the composition. Preferably, the ink and coating compositions of the present invention comprise greater than or equal to 50% (w/w) one or more multifunctional monomers. The ink and coating compositions of the present invention typically comprise from 20% to 99% (w/w) one or more multifunctional monomers. For example, the ink and coating compositions may comprise one more multifunctional monomers in an amount of 20% to 95%; or 20% to 90%; or 20% to 80%; or 20% to 70%; or 20% to 60%; or 20% to 50%; or 20% to 40%; or 20% to 30%; or 30% to 99%; or 30% to 95%; or 30% to 90%; or 30% to 80%; or 30% to 70%; or 30% to 60%; or 30% to 50%; or 30% to 40%; or 40% to 99%; or 40% to 95%; or 40% to 90%; or 40% to 80%; or 40% to 70%; or 40% to 60%; or 40% to 50%; or 50% to 99%; or 50% to 95%; or 50% to 90%; or 50% to 80% or 50% to 70%; or 50% to 60%; or 60% to 99%; or 60% to 95%; or 60% to 90%; or 60% to 80%; or 60% to 70%.

The ink and coating compositions of the present invention preferably comprise less than or equal to 50% (w/w) of one or more monofunctional monomers. For example, the ink or coating compositions may contain less than or equal to 40% monofunctional monomers; or less than or equal to 30%; or less than or equal to 20%; or less than or equal to 10%; or less than or equal to 5%; or less than or equal to 1%; or less than or equal to 0.5%; The ink and coating compositions of the present invention typically comprise from 0% to 50% (w/w) monofunctional monomers. For example, the ink or coating compositions may comprise from 0.1% to 50% (w/w) monofunctional monomers; or from 0.1% to 40%; or from 0.1% to 30%; or from 0.1% to 20%; or from 0.1% to 10%; or from 0.1% to 5%; or from 0.1% to 2%; or from 0.1% to 1%; or from 0.1% to 0.5%; or from 0.5% to 50%; or from 0.5% to 40%; or from 0.5% to 30%; or from 0.5% to 20%; or from 0.5% to 10%; or from 0.5% to 5%; or from 0.5% to 2%; or from 0.5% to 1%; or from 1% to 50%; or from 1% to 40%; or from 1% to 30%; or from 1% to 20%; or from 1% to 10%; or from 1% to 5%; or from 1% to 2%. In one embodiment, the ink and coating compositions of the present invention contain no monofunctional monomers (i.e. 100% multifunctional monomers based on the total weight of the polymerizable monomers).

Examples of suitable monofunctional and multifunctional ethylenically unsaturated monomers include, but are not limited to, those listed below, and combinations thereof, where the terms ethoxylated refers to chain extended compounds through the use of ethyleneoxide, propoxylated refers to chain extended compounds through the use of propylene oxide, and alkoxylated refers to chain extended compounds using either or both ethyleneoxide and propylene oxide. Preferably, the alkoxylated monomers have a degree of alkoxylation of greater than or equal to 2. Equivalent methacrylate compounds are also capable of being used, although those skilled in the art will appreciate that methacrylate compounds have lower reactivity than their equivalent acrylate counterparts.

Suitable monofunctional ethylenically unsaturated monomers include, but are not limited to: isobutyl acrylate; cyclohexyl acrylate; iso-octyl acrylate; n-octyl acrylate; isodecyl acrylate; iso-nonyl acrylate; octyl/decyl acrylate; lauryl acrylate; 2-propyl heptyl acrylate; tridecyl acrylate; hexadecyl acrylate; stearyl acrylate; iso-stearyl acrylate; behenyl acrylate; tetrahydrofurfuryl acrylate; 4-t-butyl cyclohexyl acrylate; 3,3,5-trimethylcyclohexane acrylate; isobornyl acrylate; dicyclopentyl acrylate; dihydrodicyclopentadienyl acrylate; dicyclopentenyloxyethyl acrylate; dicyclopentanyl acrylate; benzyl acrylate; phenoxyethyl acrylate; 2-hydroxy-3-phenoxypropyl acrylate; alkoxylated nonylphenol acrylate; cumyl phenoxyethyl acrylate; cyclic trimethylolpropane formal acrylate; 2(2-ethoxyethoxy) ethyl acrylate; polyethylene glycol monoacrylate; polypropylene glycol monoacrylate; caprolactone acrylate; ethoxylated methoxy polyethylene glycol acrylate; methoxy triethylene glycol acrylate; tripropyleneglycol monomethyl ether acrylate; diethylenglycol butyl ether acrylate; alkoxylated tetrahydrofurfuryl acrylate; ethoxylated ethyl hexyl acrylate; alkoxylated phenol acrylate; ethoxylated phenol acrylate; ethoxylated nonyl phenol acrylate; propoxylated nonyl phenol acrylate; polyethylene glycol o-phenyl phenyl ether acrylate; ethoxylated p-cumyl phenol acrylate; ethoxylated nonyl phenol acrylate; alkoxylated lauryl acrylate; ethoxylated tristyrylphenol acrylate; N-(acryloyloxyethyl)hexahydrophthalimide; N-butyl-1,2 (acryloyloxy) ethyl carbamate; acryloyl oxyethyl hydrogen succinate; octoxypolyethylene glycol acrylate; octafluoropentyl acrylate; 2-isocyanato ethyl acrylate; acetoacetoxy ethyl acrylate; 2-methoxyethyl acrylate; dimethyl aminoethyl acrylate; 2-carboxyethyl acrylate; 4-hydroxy butyl acrylate; and combinations thereof.

Suitable multifunctional ethylenically unsaturated monomers include, but are not limited to: 1,3-butylene glycol diacrylate; 1,4-butanediol diacrylate; neopentyl glycol diacrylate; ethoxylated neopentyl glycol diacrylate; propoxylated neopentyl glycol diacrylate; 2-methyl-1,3-propanediyl ethoxy acrylate; 2-methyl-1,3-propanediol diacrylate; ethoxylated 2-methyl-1,3-propanediol diacrylate; 3 methyl 1,5-pentanediol diacrylate; 2-butyl-2-ethyl-1,3-propanediol diacrylate; 1,6-hexanediol diacrylate; alkoxylated hexanediol diacrylate; ethoxylated hexanediol diacrylate; propoxylated hexanediol diacrylate; 1,9-nonanediol diacrylate; 1,10-decanediol diacrylate; ethoxylated hexanediol diacrylate; alkoxylated hexanediol diacrylate; diethyleneglycol diacrylate; triethylene glycol diacrylate; tetraethylene glycol diacrylate; polyethylene glycol diacrylate; propoxylated ethylene glycol diacrylate; dipropylene glycol diacrylate; tripropyleneglycol diacrylate; polypropylene glycol diacrylate; poly (tetramethylene glycol) diacrylate; cyclohexane dimethanol diacrylate; ethoxylated cyclohexane dimethanol diacrylate; alkoxylated cyclohexane dimethanol diacrylate; polybutadiene diacrylate; hydroxypivalyl hydroxypivalate diacrylate; tricyclodecanedimethanol diacrylate; 1,4-butanediylbis[oxy(2-hydroxy-3,1-propanediyl)]diacrylate; ethoxylated bisphenol A diacrylate; propoxylated bisphenol A diacrylate; propoxylated ethoxylated bisphenol A diacrylate; ethoxylated bisphenol F diacrylate; 2-(2-Vinyloxyethoxy)ethyl acrylate; dioxane glycol diacrylate; ethoxylated glycerol triacrylate; glycerol propoxylate triacrylate; pentaerythritol triacrylate; trimethylolpropane triacrylate; caprolactone modified trimethylol propane triacrylate; ethoxylated trimethylolpropane triacrylate; propoxylated trimethylol propane triacrylate; tris (2-hydroxy ethyl) isocyanurate triacrylate; e-caprolactone modified tris (2-hydroxy ethyl) isocyanurate triacrylate; melamine acrylate oligomer; pentaerythritol tetraacrylate; ethoxylated pentaerythritol tetraacrylate; di-trimethylolpropane tetra acrylate; dipentaerythritol pentaaacrylate; dipentaerythritol hexaaacrylate; ethoxylated dipentaerythritol hexaacrylate; and combinations thereof.

Examples of monomers comprising free radically polymerizable groups other than acrylate include N-vinyl amides, vinyl ethers and vinyl esters. Examples of N-vinyl amides include, but are not limited to, N-vinylcaprolactam (NVC), N-vinyl pyrollidone (NVP), diacetone acrylamide, N-vinyl oxazolidinone or N-vinyl methoxazolidinone, N-vinyl carbazole, N-acryloxyoxyethylcyclohexanedicarboximide, N-vinyl imidazole, N-vinyl-N-methylacetamide (VIMA) or acryloyl morpholine (ACMO), and combinations thereof. Examples of vinyl ethers and vinyl esters include, but are not limited to; 2-(2-vinyloxyethoxy)ethyl(meth)acrylate (VEEA, VEEM); diethylene glycol divinyl ether (DVE2); triethylene glycol divinyl ether (DVE3); ethyl vinyl ether; n-butyl vinyl ether; isobutyl vinyl ether; tert-butyl vinyl ether; cyclohexyl vinyl ether (CHVE); 2-ethylhexyl vinyl ether (EHVE); dodecyl vinyl ether (DDVE); octadecyl vinyl ether (ODVE); 1-2-butanediol divinyl ether (BDDVE); 1,4-cyclohexanedimethanol divinyl ether (CHDM-di); hydroxybutyl vinylether (HBVE); 1,4-cyclohexanedimethanol monovinyl ether (CHDM-mono); 1,2,4-trivinylcyclohexane (TVCH); vinylphosphonic acid dimethylester (VPA); or vinylphosphonic acid dimethyl ester (VPADME); and combinations thereof.

As described earlier, the invention also includes the use of monomers and oligomers which comprise two or more different polymerisable groups as part of their chemical structure, otherwise known as hybrid monomers. Thus, the use of those monomers revealed in U.S. Pat. Nos. 6,767,980 and 6,310,115 are herein covered by the current invention. Specific examples of hybrid monomers include 2-(2-vinyloxyethoxy)ethyl acrylate ('VEEA', ex. Nippon Shokubai) and 2-(2-vinyloxyethoxy)ethyl methacrylate ('VEEM', ex. Nippon Shokubai).

Photoinitiators may optionally be included in the energy curable ink and coating compositions of the present invention, but they are not required for the EB initiation process. However, they can be included for instances where the inks, or coatings, need to be 'pinned' prior to the EB-curing stage. 'Pinning' is described above. There is no limit on the concentration of the photoinitiator component of compositions of the current invention. However, as photoinitiators are known to attenuate the electron beam curing it is preferred that the total concentration of photoinitiators is below 5% (w/w) of the total composition, preferably less than 3% (w/w) and more preferably less than 1% (w/w). When ink and coating compositions of the current invention are pinned under the action of UV-light, any UV-light source producing an actinic effect can be used. A non-limiting list of potential UV light sources includes, but is not limited to medium pressure mercury lamps, low pressure mercury lamps, UV-LED, UVC lamps, xenon lamps, daylight. A particularly preferred photoiniator class for the UV-pinning of inks and coatings of the current invention are the acylphosphine oxide type.

When present, photoinitiators are typically present in an amount of 0.1% to 5% (w/w), based on the total weight of the ink or coating composition. For example, the energy curable ink or coating compositions may comprise one or more photoinitiators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Suitable types of photoinitiators include, but are not limited to α-hydroxyketones, acyl phosphine oxides, α-aminoketones, thioxanthones, benzophenones, phenylglyoxylates, oxime esters, and combinations thereof.

Suitable α-hydroxyketones include, but are not limited to: 1-hydroxy-cyclohexyl-phenyl-ketone; 2-hydroxy-2-methyl-1-phenyl-1-propanone; 2-hydroxy-2-methyl-4'-tert-butyl-propiophenone; 2-hydroxy-4'-(2-hydroxyethoxy)-2-methyl-propiophenone; 2-hydroxy-4'-(2-hydroxypropoxy)-2-methyl-propiophenone; oligo 2-hydroxy-2-methyl-1-[4-(1-methyl-vinyl)phenyl]propanone; bis[4-(2-hydroxy-2-methylpropionyl)phenyl]methane; 2-hydroxy-1-[1-[4-(2-hydroxy-2-methylpropanoyl)phenyl]-1,3,3-trimethylindan-5-yl]-2-methylpropan-1-one; 2-hydroxy-1-[4-[4-(2-hydroxy-2-methylpropanoyl)phenoxy]phenyl]-2-methylpropan-1-one; and combinations thereof.

Suitable acylphosphine oxides include, but are not limited to: 2,4,6-trimethylbenzoyl-diphenylphosphine oxide; ethyl-(2,4,6-trimethylbenzoyl)phenyl phosphinate; bis-(2,4,6-trimethylbenzoyl)-phenylphosphine oxide; and combinations thereof.

Suitable α-aminoketones include, but are not limited to: 2-methyl-1-[4-methylthio)phenyl]-2-morpholinopropan-1- one; 2-benzyl-2-dimethylamino-1-(4-morpholinophenyl)-butan-1-one; 2-dimethylamino-2-(4-methyl-benzyl)-1-(4-morpholin-4-yl-phenyl)-butan-1-one; and combinations thereof.

Suitable thioxanthones include, but are not limited to: 2-4-diethylthioxanthone, isopropylthioxanthone, 2-chloro-thioxanthone, and 1-chloro-4-propoxythioxanthone; and combinations thereof.

Suitable benzophenones include, but are not limited to: benzophenone; 4-phenylbenzophenone; and 4-methylbenzophenone; methyl-2-benzoylbenzoate; 4-benzoyl-4-methyldiphenyl sulphide; 4-hydroxybenzophenone; 2,4,6-trimethyl benzophenone, 4,4-bis(diethylamino)benzophenone; benzophenone-2-carboxy(tetraethoxy)acrylate; 4-hydroxybenzophenone laurate; 1-[4-[benzoylphenylsulpho]phenyl]-2-methyl-2-(4-methylphenylsulphonyl)propan-1-one; and combinations thereof.

Suitable phenylglyoxylates include, but are not limited to: phenyl glyoxylic acid methyl ester; oxy-phenyl-acetic acid 2-[hydroxyl-ethoxy]-ethyl ester; oxy-phenyl-acetic acid 2-[2-oxo-2-phenyl-acetoxy-ethoxy]-ethyl ester; and combinations thereof.

Suitable oxime esters include, but are not limited to: 1-phenyl-1,2-propanedione-2-(O-ethoxycarbonyl)oxime; [1-(4-phenylsulfanylbenzoyl)heptylideneamino]benzoate; [1-[9-ethyl-6-(2-methylbenzoyl)carbazol-3-yl]-ethylideneamino]acetate; and combinations thereof.

Examples of other suitable photoinitiators include diethoxy acetophenone; benzil; benzil dimethyl ketal; titanocen radical initiators such as titanium-bis(n 5-2,4-cyclopentadien-1-yl)-bis-[2,6-difluoro-3-(1H-pyrrol-1-yl) phenyl]; 9-fluorenone; camphorquinone; 2-ethyl anthraquinone; and the like.

An amine synergist may also be included in the formulation. Suitable examples include, but are not limited to: aromatic amines, such as 2-(dimethylamino)ethylbenzoate; N-phenyl glycine; benzoic acid, 4-(dimethylamino)-,1,1'-[(methylimino)di-2,1-ethanediyl] ester; and simple alkyl esters of 4-(N,N-dimethylamino)benzoic acid and other positional isomers of N,N-dimethylamino)benzoic acid esters, with ethyl, amyl, 2-butoxyethyl and 2-ethylhexyl esters being particularly preferred; aliphatic amines, such as such as N-methyldiethanolamine, triethanolamine and tri-isopropanolamine; aminoacrylates and amine modified polyether acrylates, such as EBECRYL 80, EBECRYL 81, EBECRYL 83, EBECRYL 85, EBECRYL 880, EBECRYL LEO 10551, EBECRYL LEO 10552, EBECRYL LEO 10553, EBECRYL 7100, EBECRYL P115 and EBECRYL P116 available from ALLNEX; CN501, CN550, CN UVA421, CN3705, CN3715, CN3755, CN381 and CN386, all available from Sartomer; GENOMER 5142, GENOMER 5161, GENOMER 5271 and GENOMER 5275 from RAHN; PHOTOMER 4771, PHOTOMER 4967, PHOTOMER 5006, PHOTOMER 4775, PHOTOMER 5662, PHOTOMER 5850, PHOTOMER 5930, and PHOTOMER 4250 all available from IGM, LAROMER LR8996, LAROMER LR8869, LAROMER LR8889, LAROMER LR8997, LAROMER PO 83F, LAROMER PO 84F, LAROMER PO 94F, LAROMER PO 9067, LAROMER PO 9103, LAROMER PO 9106 and LAROMER PO77F, all available from BASF; AGISYN 701, AGISYN 702, AGISYN 703, NeoRad P-81 and NeoRad P-85 all available from DSM-AGI. When present, amine synergists are typically present in an amount of about 0.1% to 5% (w/w), based on the total weight of the ink or coating composition. For example, the energy curable ink or coating compositions may comprise one or more amine synergists in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Particularly preferred amine synergists are aminoacrylates formed by the Michael reaction of polymerizable acrylated monomers or oligomers, with alkanolamines, as revealed by WO 2016/186838 and included herein. The inventors have found that the EB-cure of inventive compositions is enhanced when the concentration of such aminoacrylates is greater than 2.5% and preferably 5.0% or greater. However, it should be understood that there is no restriction on the concentration of such aminoacrylates in compositions of the invention.

Polymeric photoinitiators and sensitizers are also suitable, including, for example, polymeric aminobenzoates (GENOPOL AB-1 or AB-2 from RAHN; Omnipol ASA from IGM or Speedcure 7040 from Lambson), polymeric benzophenone derivatives (GENOPOL BP-1 or BP-2 from RAHN; Omnipol BP, Omnipol BP2702 or Omnipol 682 from IGM or Speedcure 7005 from Lambson); polymeric thioxanthone derivatives (GENOPOL TX-1 or TX-2 from RAHN, Omnipol TX from IGM or Speedcure 7010 from Lambson); polymeric aminoalkylphenones such as Omnipol 910 from IGM; polymeric benzoyl formate esters such as Omnipol 2712 from IGM; and the polymeric sensitizer Omnipol SZ from IGM.

The inks and coatings of the present invention may also contain one or more aliphatic silicone acrylates, such as silicone polyether acrylates. When present, the aliphatic silicone acrylates are typically present in an amount of 0% to 5% (w/w), based on the total weight of the composition. For example, the aliphatic silicone acrylates may be present in an amount of about 0.1% to about 5%; or about 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The addition of passive (inert) resins can also be advantageous as these can be used to control the porosity of the coating. Typically, acrylic based passive resins are preferred. When present, passive resins are typically present in an amount of 1% to 15% (w/w), based on the total weight of the ink or coating composition. For example, the passive resins may be present in an amount of about 1% to about 10%; or about 1% to about 5%; or about 1% to about 3%.

A stabilizer may also be used in the composition to ensure good pot life of the ink, examples of which are nitroxy based stabilizers such as OHTEMPO, TEMPO, and Irgastab UV10. Phenolic stabilizers such as hydroquinone (HQ), methyletherhydroquinone (MEHQ), butylhydroxytoluene (BHT) and 2,6-di-tert-butyl-N,N-dimethylamino-p-cresol. Nitrosophenylhydroxylamine (NPHA) base inhibitors NPHA, amine salts, and metal salts (Al salt, N-PAL) plus the aromatic amine inhibitors diphenylamine (DPA) and phenylenediamine (PPD) are also suitable. Other suitable stabilizers are Florstab UV-1 and UV-8, and Genorad 16 and 18. When present, stabilizers are typically present in an amount of about 0.1% to 5% (w/w), based on the total weight of the ink or coating composition. For example, the energy curable ink or coating compositions may comprise one or more stabilizers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Included in the ink formulation can be a suitable de-aerator, which will prevent the formation of air inclusions and pinholes in the cured coating. These also reduce rectified diffusion which can cause reliability issues in the printhead. The following products are available from EVONIK: TEGO AIREX 900, 910, 916, 920, 931, 936, 940, 944, 945, 950, 962, 980, and 986. When present, de-aerators are typically present in an amount of about 0.1% to about 5% (w/w), based on the total weight of the ink or coating composition. For example, the energy curable ink or coating compositions may comprise one or more de-aerators in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Defoamers can also be included in the formulation, these prevent the formation of foam during manufacture of the ink and also while jetting. These are particularly important with recirculating printheads. Suitable defoamers include TEGO FOAMEX N, FOAMEX 1488, 1495, 3062, 7447, 800, 8030, 805, 8050, 810, 815N, 822, 825, 830, 831, 835, 840, 842, 843, 845, 855, 860, and 883, TEGO FOAMEX K3, TEGO FOAMEX K7/K8 and TEGO TWIN 4000 available from EVONIK. Available from BYK are BYK-066N, 088, 055, 057, 1790, and 020, BYK-A 530 and 067A, and BYK 354. When present, defoamers are typically present in an amount of about 0.1% to about 5% (w/w), based on the total weight of the ink or coating composition. For example, the energy curable ink or coating compositions may comprise one or more defoamers in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

Surface control additives are often used to control the surface tension of the ink, which is required to adjust the wetting on the face plate of the printhead and also to give the desired drop spread on the substrate or, and in the case of multi pass inkjet printing, wet on dry drop spread. They can also be used to control the level of slip and scratch resistance of the coating. Suitable surface control additives include but are not limited to TEGO FLOW 300, 370, and 425, TEGO GLIDE 100, 110, 130, 406, 410, 411, 415, 420, 432, 435, 440, 482, A115, and B1484, TEGO GLIDE ZG 400, TEGO RAD 2010, 2011, 2100, 2200N, 2250, 2300, 2500, 2600, 2650, and 2700, TEGO TWIN 4000 and 4100, TEGO WET 240, 250, 260, 265, 270, 280, 500, 505 and 510 and TEGO WET KL245 all available from EVONIK. Available from BYK are BYK 333 and 337, BYK UV3500, BYK 378, 347 and 361, BYK UV3530, 3570, CERAFLOUR 998 and 996, NANOBYK 3601, 3610, and 3650 and CERMAT 258. From CYTEC, EBECRYL 350 and 1360, MODAFLOW 9200, and EBECRYL 341. From SARTOMER the aliphatic silicone acrylate CN9800 may be used. When present, surface control additives are typically present in an amount of about 0.1% to about 5% (w/w), based on the total weight of the ink or coating composition. For example, the surface control additives may be present in an amount of about 0.1% to about 4%; or about 0.1% to about 3%; or about 0.1% to about 2%; or about 0.1% to about 1%; or about 0.1% to about 0.5%. For example, the energy curable ink or coating compositions may comprise one or more surface control additives in an amount of 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The ink and coating compositions of the present invention may optionally contain one or more solvents. Solvents include, but are not limited to, water, hydrocarbons, ethers, esters, and ketones. When present, the solvents are included in an amount of less than 5% (w/w), based on the total weight of the ink or coating composition. For example, the solvents may be present in an amount of about 0.1% to 5% (w/w); or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%.

The ink compositions of the present invention may optionally contain one or more colorants, including pigments and/or dyes. Examples of suitable organic or inorganic pigments include, but are not limited to, carbon black, zinc oxide, titanium dioxide, phthalocyanine, anthraquinones, perylenes, carbazoles, monoazo and disazobenzimidazoles, rhodamines, indigoids, quinacridones, diazopyranthrones, dinitranilines, pyrazoles, diazopyranthrones, dinityanilines, pyrazoles, dianisidines, pyranthrones, tetracholoroisoindolines, dioxazines, monoazoacrylides and anthrapyrimidines. The dyes include but are not limited to azo dyes, anthraquinone dyes, xanthene dyes, azine dyes, combinations thereof and the like.

Commercial organic pigments classified according to Color Index International according to the following trade designations, blue pigments PB1, PB15, PB15:1, PB15:2, PB15:3, PB15:4, PB15:6, PB16, PB60; brown pigments PB8, PB23, and PB265; green pigments PG1, PG7, PG10 and PG36; yellow pigments PY3, PY14, PY16, PY17, PY24, PY65, PY73, PY74 PY83, PY95, PY97, PY108, PY109, PY110, PY113, PY128, PY129, PY138, PY139, PY150, PY151, PY154, PY156, PY175, PY180 and PY213; orange pigments PO5, PO15, PO16, PO31, PO34, PO36, PO43, PO48, PO51, PO60, PO61 and PO71; red pigments PR4, PR5, PR7, PR9, PR22, PR23, PR48, PR48:2, PR49, PR112, PR122, PR123, PR149, PR166, PR168, PR170, PR177, PR179, PR190, PR202, PR206, PR207, PR224 and PR254: violet pigments PV19, PV23, PV32, PV37 and PV42; black pigments.

The pigments are milled to typically less than 1 micrometer after milling with a preferred particle size distribution of 10-500 nm, more preferably 10-350 nm to have better transparency and a wide color gamut. The pigment dispersion will typically contain 60-90% monomer which can be a mono or multifunctional (meth)acrylate monomer, with added stabilizer, inhibitor, dispersant and optionally a pigment additive/synergist and/or a wetting additive/oligomer/resin. The ratio of pigment to dispersant would usually be between 1:2 to 9:1 depending on the chemistry of the pigment and dispersant. Examples of typical dispersants would include EFKA 7414, 7476, 7477, 7700, 7701, 7702, 7710, 7731 and 7732 available from BASF and SOLSPERSE 1700, 1900, 24000SC/GR, 26000, 32000, 33000, 35000, 36000, 39000, 41000 and 71000 available from LUBRIZOL. Examples of additive/synergists to aid dispersion stability include SOLSPERSE 5000, 12000 and 22000 from LUBRIZOL.

When present, organic pigments and dyes are typically present in an amount of about 0.1% to about 7% (w/w), based on the total weight of the composition. For example, the organic pigments and dyes may be present in an amount of 0.1% to 6.5%; or 0.1% to 6%; or 0.1% to 5.5%; or 0.1% to 5%; or 0.1% to 4.5%; or 0.1% to 4%; or 0.1% to 3.5%; or 0.1% to 3%; or 0.1% to 2.5%; or 0.1% to 2%; or 0.1% to 1.5%; or 0.1% to 1%; or 0.1% to 0.5%; or 0.5% to 7%; or 0.5% to 6.5%; or 0.5% to 6%; or 0.5% to 5.5%; or 0.5% to 5%; or 0.5% to 4.5%; or 0.5% to 4%; or 0.5% to 3.5%; or 0.5% to 3%; or 0.5% to 2.5%; or 0.5% to 2%; or 0.5% to 1.5%; or 0.5% to 1%; or 1% to 7%; or 1% to 6.5%; or 1% to 6%; or 1% to 5.5%; or 1% to 5%; or 1% to 4.5%; or 1% to 4%; or 1% to 3.5%; or 1% to 3%; or 1% to 2.5%; or 1% to 2%; or 1% to 1.5%.

When present, inorganic pigments are typically present in an amount of 1% to 40% (w/w), based on the total weight of the composition. For example, the inorganic pigments may be present in an amount of 1% to 35%; or 1% to 30%; or 1% to 25%; or 1% to 20%; or 1% to 15%; or 5% to 40%; or 5% to 35%; or 5% to 30%; or 5% to 25%; or 5% to 20%; or 5% to 15%; or 10% to 35%; or 10% to 30%; or 10% to 25%; or 10% to 20%; or 10% to 15%; or 15% to 40%; or 15% to 35%; or 15% to 30%; or 15% to 25%; or 15% to 20%; or 20% to 40%; or 20% to 35%; or 20% to 30%; or 20% to 25%.

In energy curable inkjet formulations the adhesion is likely to be related to the crosslink density of the cured coating, which will in turn be determined by the functionality of the polymerizable monomers. It is commonly held that, as the crosslink density of any cured coating increases, there can be an observable decrease in the adhesion of that coating. Thus, adhesion will be reduced if the degree of conversion of the monomers is increased. The degree of conversion could be reduced if the photoinitiator package is not optimized to the spectral output of the lamps or if a passive resin is used in the formulation. The principle will follow that the higher the reactive functionality the more rapidly crosslink density increases during polymerization. Degree of conversion can also be increased by either elevating the ink temperature during cure, increasing the substrate temperature or curing under nitrogen to prevent oxygen inhibition. Steric factors such as the location of the polymerizable groups can also affect degree of conversion. As crosslinking proceeds, then the glass transition temperature of the cured film will increase with double bond conversion. If the glass transition point is lower than the curing temperature, double bond consumption can continue until close to 100% conversion is achieved. The vitrification point, and hence the properties of the cured ink, can be altered by careful selection of monomers, photoinitiators and stabilizers, plus control of external factors such as lamp spectra output, temperature of cure and the presence of nitrogen inerting.

Polar groups such as hydroxy or carboxy groups will increase the surface tension, while nonpolar groups, such as long alkyl chains, siloxanes, or (fluoro)alkyl groups, reduce it.

Good adsorption of the ink or coating into the film will improve the adhesion, so the number and strength of the contact with the substrate needs to be maximized. Typically inclusion of materials with hydroxyl or carboxyl functionality can be beneficial. Selection of monomers that can swell the substrate and increase penetration of the ink into the substrate can help adhesion. Examples of these can include N-vinylcaprolactam and ACMO for energy curable inkjet formulations. Another area that causes problems is shrinkage during cure. This will reduce the contact of the cured ink with the substrate which will reduce adhesion. Higher crosslink density will result in greater shrinkage and hence reduced adhesion which can be overcome by curing by electron beam bombardment.

The EB dose typically used in the method of the present invention is between 30 kGy and 200 kGy. For example, the EB dose may be greater than or equal to 30 kGy; or greater than or equal to 40 kGy; or greater than or equal to 50 kGy; or greater than or equal to 60 kGy; or greater than or equal to 70 kGy; or greater than or equal to 80 kGy; or greater than or equal to 90 kGy; or greater than or equal to 100 kGy; or greater than or equal to 110 kGy; or greater than or equal to 120 kGy; or greater than or equal to 130 kGy; or greater than or equal to 140 kGy; or greater than or equal to 150 kGy. For example, the EB dose may be between 30 to 200 kGy; or between 40 to 200 kGy; or between 50 to 200 kGy; or between 60 to 200 kGy; or between 70 to 200 kGy; or between 80 to 200 kGy; or between 90 to 200 kGy; or between 100 to 200 kGy; or between 110 to 200 kGy; or between 120 to 200 kGy; or between 130 to 200 kGy; or between 140 to 200 kGy; or between 150 to 200 kGy; or between 160 to 200 kGy; or between 170 to 200 kGy; or between 180 to 200 kGy; or between 190 to 200 kGy; or between 30 to 190 kGy; or between 30 to 180 kGy; or between 30 to 170 kGy; or between 30 to 160 kGy; or between 30 to 150 kGy; or between 30 to 140 kGy; or between 30 to 130 kGy; or between 30 to 120 kGy; or between 30 to 110 kGy; or between 30 to 100 kGy; or between 30 to 90 kGy; or between 30 to 80 kGy; or between 30 to 70 kGy; or between 30 to 60 kGy; or between 30 to 50 kGy; or between 30 to 40 kGy; or between 40 to 190 kGy; or between 40 to 180 kGy; or between 40 to 170 kGy; or between 40 to 160 kGy; or between 40 to 150 kGy; or between 40 to 140 kGy; or between 40 to 130 kGy; or between 40 to 120 kGy; or between 40 to 110 kGy; or between 40 to 100 kGy; or between 40 to 90 kGy; or between 40 to 80 kGy; or between 40 to 70 kGy; or between 40 to 60 kGy; or between 40 to 50 kGy; or between 50 to 190 kGy; or between 50 to 180 kGy; or between 50 to 170 kGy; or between 50 to 160 kGy; or between 50 to 150 kGy; or between 50 to 140 kGy; or between 50 to 130 kGy; or between 50 to 120 kGy; or between 50 to 110 kGy; or between 50 to 100 kGy; or between 50 to 90 kGy; or between 50 to 80 kGy; or between 50 to 70 kGy; or between 50 to 60 kGy; or between 60 to 190 kGy; or between 60 to 180 kGy; or between 60 to 170 kGy; or between 60 to 160 kGy; or between 60 to 150 kGy; or between 60 to 140 kGy; or between 60 to 130 kGy; or between 60 to 120 kGy; or between 60 to 110 kGy; or between 60 to 110 kGy; or between 60 to 100 kGy; or between 60 to 90 kGy; or between 60 to 80 kGy; or between 60 to 70 kGy; or between 70 to 190 kGy; or between 70 to 180 kGy; or between 70 to 170 kGy; or between 70 to 160 kGy; or between 70 to 150 kGy; or between 70 to 140 kGy; or between 70 to 130 kGy; or between 70 to 120 kGy; or between 70 to 110 kGy; or between 70 to 100 kGy; or between 70 to 90 kGy; or between 70 to 80 kGy; or between 80 to 190 kGy; or between 80 to 180 kGy; or between 80 to 170 kGy; or between 80 to 160 kGy; or between 80 to 150 kGy; or between 80 to 140 kGy; or between 80 to 130 kGy; or between 80 to 120 kGy; or between 80 to 110 kGy; or between 80 to 100 kGy; or between 80 to 90 kGy.

The accelerating voltage of the EB radiation used in the method of the present invention is typically between 70 keV and 200 keV. For example, the accelerating voltage may be between 80 and 200 keV; or between 90 and 200 keV; or between 100 and 200 keV; or between 110 and 200 keV; or between 120 and 200 keV; or between 130 and 200 keV; or between 140 and 200 keV; or between 150 and 200 keV; or between 160 and 200 keV; or between 170 and 200 keV; and between 180 and 200 keV; or between 190 and 200 keV. For example, the accelerating voltage may be between 70 and 190 keV; or between 70 and 180 keV; or between 70 and 160 keV; 70 and 150 keV; or between 70 and 140 keV; or between 70 and 130 keV; or between 70 and 120 keV; or between 70 and 110 keV; or between 70 and 100 keV; or between 70 and 90 keV; or between 70 and 80 keV; or between 80 and 190 keV; or between 80 and 180 keV; or between 80 and 170 keV; or between 80 and 160 keV; or between 80 and 150 keV; or between 80 and 140 keV; or between 80 and 130 keV; or between 80 and 120 keV; or between 80 and 110 keV; or between 80 and 100 keV; or between 80 and 90 keV; or between 90 and 190 keV; or between 90 and 180 keV; or between 90 and 170 keV; or between 90 and 160 keV; or between 90 and 150 keV; or between 90 and 140 keV; or between 90 and 130 keV; or between 90 and 120 keV; or between 90 and 110 keV; or between 90 and 100 keV.

The formulated compositions can be cured by electron beam cure using an acceleration voltage of greater than or equal to 80 keV, a dose of greater than or equal to 30 kGy, and nitrogen inertion giving an oxygen level of less than or equal to 200 parts per million (ppm). The resultant cured coating will have excellent adhesion on plastic substrates such as polycarbonate, PVC, acrylic, polypropylene, polystyrene, HDPE, LDPE and aluminium composite materials.

EXAMPLES

The following examples illustrate specific aspects of the present invention, and are not intended to limit the scope thereof in any respect and should not be so construed.

Preparation of Inks

Inks were prepared by mixing the components according to the formulations in the following examples, using a Silverson mixer.

Printing/Application of Inks

The inks were applied to various substrates at 12 μm thickness and then cured at the specified EB dose. A Comet ebeam EBLab was used to cure the inks. This unit has a maximum beam energy of 200 keV with doses up to 450 kGy in a single pass possible. Nitrogen inertion was applied until the oxygen level was less than 200 parts per million (ppm), with the electron accelerating voltage in keV and the dose of electrons in kGy.

For testing of low migration inks, the inks were applied to 36 μm Melinex S (a polyester film) at 12 μm thickness, and cured with EB radiation at the specified EB dose.

Viscosity Measurements

The viscosities of the inks were measured using a Brookfield DV-II+ Pro Viscometer equipped with spindle no. 18, at 100 rpm.

Cross-Hatch Adhesion Test

The cross-hatch adhesion test was conducted in accordance with ISO 2409, "Paints and varnishes—cross-cut test". The following items were used to conduct the cross-hatch adhesion test: test specimen (printed substrate) with the printed and cured ink thereon; adhesive tape approved by ISO 2409 (IS02409 Adhesive Tape, ex. Elcometer); rubber eraser; timer; and sharp knife.

The test specimen was placed on a flat surface, and an area of the printed (decorative ink layer) surface was selected. A set of 6 parallel lines approximately 20 cm long and 1 mm apart, was scored across the selected area, and deep enough to penetrate beneath the decorative ink layer. Another set of 6 parallel lines, approximately 20 cm long and 1 mm apart, perpendicular to the first set of lines and centered on their center, was scored. A 75 cm length of adhesive tape was stuck on the scored area, with one end left unattached to hold on to during removal. The surface of the tape was rubbed gently with the rubber eraser to ensure even contact between the tape and surface of the test specimen. The tape was left for 90 seconds. After 90 seconds, the tape was removed by seizing the free end and pulling the tape back on itself at approximately 180 degrees in a fast, even and continuous movement. The scored area was inspected and performance was recorded according to the ISO 2409 grading scheme:

0=no removal, edges of the cuts are smooth

1=detachment of small flakes of coating at the intersections of the cuts; cross-cut area affected is ≤5%.

2=coating flaked along the edges and/or at the intersections of the cuts; cross-cut area affected is >5%, but ≤15%.

3=coating has flaked along the edges of the cuts partly or wholly in large ribbons, and/or has flaked partly or wholly on different parts of the squares; cross-cut area affected is >15%, but ≤35%.

4=coating has flaked along the edges of the cuts in large ribbons, and/or some squares have detached partly or wholly; cross-cut area affected is >35%, but ≤65%.

5=more than 65% of the grid area was removed.

For the purposes of the present invention, a score of 0, 1, 2, or 3 was considered a pass; a score of 4 or 5 was considered a fail.

Assessing the Level of Extractable Monomer

The level of unbound, unreacted monomer in a print was determined by a "total extraction" test. To conduct this test, 30 cm$^2$ of the print was soaked in 2 ml of methanol, containing 0.025% (w/w) of mono methyl ether hydroquinone (MEHQ; stabilizer) for 24 hours at room temperature before the methanol solution was analyzed by GC-MS. The GC-MS was calibrated with known solutions of the monomers and the results are reported as parts per billion (ppb), the equivalent amount of monomer that would be present in 1 kg of food according to the EU packaging model (where it is assumed that 600 cm$^2$ of substrate is required to package 1 kg of food) if all of the unbound monomer in the print were to migrate into and contaminate the food. For the purposes of the present invention, the amount of each individual monomer extracted would preferably be less than or equal to 500 ppb, more preferably less than or equal to 200 ppb, or less than or equal to 100 ppb, or less than or equal to 50 ppb or less than or equal to 20 ppb, and most preferably less than or equal to 10 ppb.

Example 1. Formulations of EB Curable Inks

The formulations of EB curable Inks 1 to 3 are shown in Table 1. The viscosity of Inks 1 to 3 was between 3 and 14 cps at 45° C., which is typical of the range preferred for inkjet printing. Inks 1 to 3 are multifunctional inks, as described previously. Inks 2 and 3 contain only multifunctional monomers (i.e. no monofunctional monomers).

The formulations of the cyan dispersions used to prepare Inks 1 to 3 are shown in Table 2. The pigments were milled to have a D$_{100}$ less than 1 μm.

TABLE 1

EB curable Inks 1 to 3

| Material | Ink 1 | Ink 2 | Ink 3 |
|---|---|---|---|
| DPGDA[1] | 30.42 | 32.80 | 34.00 |
| MIRAMER M-140[2] | 20.20 | | |
| SR238 (EU)[3] | 30.86 | | |
| SR341[4] | | 30.00 | 30.00 |
| VEEA-AI[5] | | 25.00 | 25.00 |
| IRGASTAB UV 25[6] | 1.00 | | |
| Elvacite 2013[7] | 1.22 | | |
| STABILIZER 12-191[8] | 1.00 | 1.00 | |
| IONOL 103[9] | | 0.20 | |
| TEGO GLIDE 410[10] | 0.50 | 2.00 | 2.00 |
| Cyan Dispersion 1 | 14.80 | | |
| Cyan Dispersion 2 | | 9.00 | 9.00 |
| TOTAL | 100.0 | 100.0 | 100.0 |

TABLE 2

Cyan dispersions

| Material | Cyan Dispersion 1 | Cyan Dispersion 2 |
|---|---|---|
| PONPGDA[11] | | 62.34 |
| MIRAMER M-140[2] | 55.0 | |
| EFKA PX4701[12] | 14.0 | 11.66 |
| STABILIZER 12-191[8] | 1.0 | 1.0 |
| Heliogen Blue D7110[13] | 30.0 | 25.0 |

Example 2. Adhesion of Inks 1 to 3 Cured at 100 keV and 70 kGy

Inks 1 to 3 were applied to various substrates, as shown in Table 3, and cured by EB radiation with an accelerating voltage of 100 keV and an EB dose of 70 kGy. The results are reported according to the scale defined above, wherein a score of 0 means no ink is removed, and a score of 5 is the worst, with greater than 65% of ink removed.

TABLE 3

Adhesion of inks 1 to 3 at 100 keV and 70 kGy

| | Acrylic[14] | Polycarbonate[15] | Rigid PVC[16] | PET[17] |
|---|---|---|---|---|
| Ink 1 | 0 | 0 | 0 | 0 |
| Ink 2 | 0 | 0 | 0 | 0 |
| Ink 3 | 0 | 0 | 0 | 0 |

[14]3 mm rigid acrylic ex Amari Plastics
[15]3 mm rigid polycarbonate ex Amari Plastics
[16]0.5 mm rigid PVC ex Alibaba
[17]Melinex 752 ex Hififilm The data in Table 3 show that inks containing large amounts of multifunctional monomers, even only multifunctional monomers, have excellent adhesion to a range of substrates, including acrylic, polycarbonate, PVC, and PET when cured using EB radiation at an accelerating voltage of 100 keV and an EB dose of 70 kGy.

Example 3. Adhesion of Inks 1 to 3 Cured at 150 keV and 100 kGy

Inks 1 to 3 were applied to various substrates, as shown in Table 4, and cured by EB radiation with an accelerating voltage of 150 keV and an EB dose of 100 kGy. The results are reported according to the scale defined above, wherein a score of 0 means no ink is removed, and a score of 5 is the worst, with greater than 65% of ink removed.

TABLE 4

Adhesion of Inks 1 to 3 at 150 keV and 100 kGy

| | Acrylic | Polycarbonate | Rigid PVC | PET |
|---|---|---|---|---|
| Ink 1 | 0 | 0 | 0 | 0 |
| Ink 2 | 0 | 0 | 0 | 0 |
| Ink 3 | 0 | 0 | 0 | 0 |

The data in Table 4 show that inks containing large amounts of multifunctional monomers, even only multifunctional monomers, have excellent adhesion to a range of substrates, including acrylic, polycarbonate, PVC, and PET when cured using EB radiation at an accelerating voltage of 150 keV and an EB dose of 100 kGy.

Example 4. Adhesion of Inks 1 to 3 Cured at 200 keV and 200 kGy

Inks 1 to 3 were applied to various substrates, as shown in Table 5, and cured by EB radiation with an accelerating voltage of 200 keV and an EB dose of 200 kGy. The results are reported according to the scale defined above, wherein a score of 0 means no ink is removed, and a score of 5 is the worst, with greater than 65% of ink removed.

TABLE 5

Adhesion of Inks 1 to 3 at 200 keV and 200 kGy

| | Acrylic | Polycarbonate |
|---|---|---|
| Ink 1 | 0 | 0 |
| Ink 2 | 0 | 0 |
| Ink 3 | 0 | 0 |

The data in Table 4 show that inks containing large amounts of multifunctional monomers, even only multifunctional monomers, have excellent adhesion to a range of substrates, including acrylic and polycarbonate, when cured using EB radiation at an accelerating voltage of 200 keV and an EB dose of 200 kGy.

Example 5. Adhesion of Ink 3 on HDPE Cured at 100 keV and 50 kGy or 80 kGy

Ink 3 was applied to flame treated HDPE. The adhesion of Ink 3 was tested after curing at an accelerating voltage of 100 keV, and an EB dose of either 50 kGy or 80 kGy. The results are shown in Table 6.

TABLE 6

Adhesion of ink 3 on HDPE at 100 keV and 50 kGy or 80 kGy

| | HDPE |
|---|---|
| Ink 3, 100 kev/50 kGy | 0 |
| Ink 3, 100 kev/80 kGy | 0 |

The data in Table 6 show that excellent adhesion can be obtained on HDPE with Ink 3, with an accelerating voltage of 100 keV, and an EB dose of either 50 kGy or 80 kGy. As noted previously, Ink 3 is an entirely multifunctional ink, and again it was found to adhere strongly to the plastic substrate, in this case HDPE, with an EB dose in excess of 30 kGy.

Example 6. Adhesion of Inks 1 to 3 Cured at 100 keV and 30 kGy

Comparative results were obtained by applying inks 1 to 3 on various substrates, as shown in Table 7, and curing at an accelerating voltage of 100 keV and an EB dose of 30 kGy. Adhesion was tested as described above, and the results reported in Table 7.

TABLE 7

Adhesion of Inks 1 to 3 at 100 keV and 30 kGy

|  | Acrylic | Polycarbonate | Rigid PVC | PET |
|---|---|---|---|---|
| Ink 1 | 5 | 5 | 5 | 5 |
| Ink 2 | 5 | 5 | 5 | 5 |
| Ink 3 | 5 | 5 | 5 | 5 |

The data in Table 7 show that adhesion cannot be obtained on acrylic, polycarbonate, PVC, or PET substrates with Inks 1 to 3 cured with an accelerating voltage of 100 keV and an EB dose of 30 kGy. In the case of these comparative examples, both the monofunctional and multifunctional inks failed to adhere to any of the plastic films. Thus, the data show that to obtain good adhesion it is preferable to use EB doses greater than 30 kGy.

Example 7. Inks 4 to 9, Having Low Migration Potential

The following low migration Inks 4 to 9 were formulated according to the guidelines laid out in WO 2015/148094 and WO 2016/186838. The ink films were applied to freshly corona discharge treated 36 μm Melinex S. The formulations and viscosities of Inks 4 to 9 is shown in Table 9. The adhesion of inks 4 to 9 to Melinex S when cured at an accelerating voltage of 100 keV, and an EB dose of either 20 kGy, 30 kGy, or 40 kGy is also shown in Table 9.

TABLE 9

Formulations, viscosity, and adhesion of Inks 4 to 9

|  | Ink 4 | Ink 5 | Ink 6 | Ink 7 | Ink 8 | Ink 9 |
|---|---|---|---|---|---|---|
| DPGDA | 7.6 | 7.6 | 2.6 | 7.6 | 3.5 | 13.0 |
| VEEA-A1 | 22.0 | 23.0 | 23.0 | 23.0 | 23.0 | 23.0 |
| SR341 | 30.0 | 30.0 | 30.0 | 30.0 | 30.0 | 30.0 |
| SR9035[18] | 15.0 | 20.0 | 20.0 | 20.0 | 20.0 | 15.0 |
| LEO10552[19] | 10.0 | 10.0 | 15.0 | — | 10.0 | — |
| Photomer 4771[20] | — | — | — | 10.0 | — | 7.0 |
| Irgacure 819[21] | 0.5 | — | — | — | — | 0.5 |
| Omnipol TX[22] | 1.5 | — | — | — | — | — |
| KIP160[23] | 2.0 | — | — | — | — | — |
| Esacure 1[24] | 2.0 | — | — | — | — | — |
| TegoGlide 410 | 0.4 | 0.4 | 0.4 | 0.4 | — | — |
| TegoRad 2300[25] | — | — | — | — | 4.5 | — |
| TegoRad 2250[26] | — | — | — | — | — | 2.5 |
| Cyan Dispersion 2 | 9.0 | 9.0 | 9.0 | 9.0 | 9.0 | 9.0 |
| Viscosity at 45° C. (mPa · s) | 12.3 | 10.6 | 12.3 | 11.0 | 12.5 | 9.9 |
| Adhesion to Melinex S (20 kGy) | 5 | 5 | 5 | 4 | 4 | 4 |
| Adhesion to Melinex S (30 kGy) | 5 | 5 | 4 | 3 | 3 | 3 |
| Adhesion to Melinex S (40 kGy) | 2 | 1 | 1 | 1 | 0 | 0 |

Notes:
[18]SR9035 = Sartomer SR9035, ex. Arkema. Monomer for low migration applications according to WO2015/148094
[19]LEO10552 = Ebecryl LEO10552, ex. Allnex. An aminoacrylate for low migration applications according to U.S. application No. 62/161,933
[20]Photomer 4771 = An aminoacrylate, ex. IGM Resins, in accordance with U.S. application No. 62/161,933
[21]Irgacure 819, ex. BASF. Bis(2,4,6-trimethylbenzoyl)-phenylphosphineoxide.
[22]Omnipol TX, ex. IGM Resins. A Polymeric thioxanthone photoinitiator.
[23]KIP160 = Esacure KIP160, ex. Lamberti. A difunctional hydroxyl-ketone photoinitiator.
[24]Esacure 1, ex. Lamberti. An oligomeric hydroxyl-ketone photoinitiator.
[25]TegoRad 2300, ex. Evonik, a silicone polyether acrylate.
[26]TegoRad 2250, ex. Evonik, a silicone polyether acrylate.

The data in Table 9 show that, for all the inks, there is an improvement with adhesion as the EB dose is increased from 20 kGy to 30 kGy, and even more so for an EB dose of 40 kGy. It is further apparent that the correct selection of the aminoacrylate and the use of a silicone acrylate can further improve the adhesion performance of these multifunctional inks. A further observation from the data in Table 9 is that an ink designed for curing under the action of UV light, Ink 4, comprising a photoinitiator component, according to WO 2014/126720, provides slightly worse adhesion than does an equivalent ink free of any photoinitiator, Ink 5. As expected, the inks comprising silicone polyether acrylate produce a superior adhesion result. This is probably due to the improved release effect that these materials bring to a surface of a cured ink, which causes a decrease in the adhesive strength between the adhesive tape and the printed ink surface, and thereby an apparent improvement in adhesion to the substrate.

Example 8. Extraction Testing of Inks 4 to 9

The amount of monomer that could be extracted from each of Inks 4 to 9, cured at an accelerating voltage of 100 keV and an EB dose of 40 kGy was determined as described above. The amount of extractable monomer from Ink 9 cured at EB doses of 30 kGy and 50 kGy was also determined. The testing was done in accordance with methods laid out in WO 2015/148094. The results are shown in Table 10, and are expressed in ppb, the equivalent amount of monomer that would be present in 1 kg of food according to the EU packaging model (where it is assumed that 600 cm$^2$ of substrate is required to package 1 kg of food) if all the unbound monomer in the print were to migrate into and contaminate the food.

TABLE 10

Amount of monomer extracted from EB cured prints of Inks 4 to 9

| EB Dose (kGy) | Extractable Monomer (ppb) | Ink 4 | Ink 5 | Ink 6 | Ink 7 | Ink 8 | Ink 9 |
|---|---|---|---|---|---|---|---|
| 30 | PONPGDA |  |  |  |  |  | 18 |
|  | DPGDA |  |  |  |  |  | 135 |
|  | SR341 |  |  |  |  |  | 180 |
|  | VEEA |  |  |  |  |  | 495 |

TABLE 10-continued

Amount of monomer extracted from EB cured prints of Inks 4 to 9

| EB Dose (kGy) | Extractable Monomer (ppb) | Ink 4 | Ink 5 | Ink 6 | Ink 7 | Ink 8 | Ink 9 |
|---|---|---|---|---|---|---|---|
| 40 | PONPGDA | 1,100 | 21 | 8 | 10 | 7 | 5 |
|  | DPGDA | 650 | 72 | 9 | 26 | 6 | 32 |
|  | SR341 | 760 | 147 | 57 | 46 | 26 | 30 |
|  | VEEA | 1,200 | 70 | 22 | 25 | 16 | 56 |
| 50 | PONPGDA |  |  |  |  |  | <3 |
|  | DPGDA |  |  |  |  |  | 5 |
|  | SR341 |  |  |  |  |  | 3 |
|  | VEEA |  |  |  |  |  | 8 |

Comparing Ink 4 with Ink 5 shows that photoinitiators have a deleterious impact on the amount of uncured monomer present in a cured ink film after EB curing. Ideally, no photoinitiator would be included in any EB-curable ink composition, but, for inkjet especially, it is often desirable to 'pin' the inks between applications of different colors to ensure print quality, as previously described. Thus, the concentration of photoinitiators should be limited to mitigate against this loss of monomer conversion induced by the presence of photoinitiators.

Ink 6 compared with Ink 5 shows the benefit of increasing the concentration of the aminoacrylate (LEO10552) in helping to improve the conversion of monomers during EB cure.

Ink 7 compared with Ink 5 shows that the correct selection of aminoacrylate can be beneficial in helping to reduce the level of uncured monomer.

Ink 8 compared with Ink 5 shows the surprising finding that the inclusion of acrylated polyether silicones can increase the conversion of monomers during EB-cure. An aspect of the current invention is to cover inkjet compositions comprising such compounds intended for EB-curing. Ink 9 shows how an ink which is pinnable under the action of both a conventional medium pressure mercury UV-lamp and a UV-LED lamp emitting at 395 nm can be formulated via the inclusion of an acylphosphine oxide photoinitiator and preferred ink components to deliver an ink that produces very low levels of uncured monomer after EB-curing. For Ink 9, not only is improved adhesion achieved at 40 kGy, as shown in Table 9, but also significantly lower levels of uncured monomer. This confirms a preference for the invention that inks are cured at doses of 30 kGy and greater.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A method for printing an energy curable ink or coating composition on a plastic substrate, the method comprising:
   a) providing an energy curable ink or coating composition, wherein the energy curable ink or coating composition comprises:
      i) greater than or equal to 20% (w/w) one or more multifunctional polymerizable monomers, based on the total weight of the ink or coating composition;
      ii) 0% (w/w) to 5% (w/w) one or more solvents, based on the total weight of the ink or coating composition;
      iii) 0% (w/w) to 40% (w/w) one or more colorants, based on the total weight of the ink or coating composition;
      iv) 0% (w/w) to 20% (w/w) one or more monofunctional polymerizable monomers, based on the total weight of the ink or coating composition;
   b) applying the energy curable ink or coating composition of step a) to the substrate;
   c) curing the applied energy curable ink or coating composition on the substrate by electron beam radiation supplied by an electron beam emitter, wherein:
      i) the accelerating voltage of the electron beam emitter is greater than or equal to 70 keV; and
      ii) cure dose is greater than or equal to 30 kGy.

2. The method of claim 1, wherein the energy curable ink or coating composition comprises greater than or equal to 40% (w/w) one or more multifunctional monomers.

3. The method of claim 1, wherein the energy curable ink or coating composition contains 100% (w/w) one or more multifunctional monomers, based on the total weight of the polymerizable monomers and/or oligomers.

4. The method of claim 1, wherein the energy curable ink or coating composition further comprises one or more photoinitiators.

5. The method of claim 4, wherein the one or more photoinitiators are present in an amount of less than or equal to 5% (w/w), based on the total weight of the ink or coating composition.

6. The method of claim 4, wherein at least one of the photoinitiators is an acylphosphine oxide.

7. The method of claim 4, wherein all of the photoinitiators are an acylphosphine oxide.

8. The method of claim 4, wherein at least one of the acylphosphine oxide photoinitiators is bis(2,4,6-trimethylbenzoyl)-phenylposphine oxide.

9. The method of claim 1, wherein the energy curable ink or coating composition further comprises a silicone polyether acrylate.

10. The method of claim 1, wherein the energy curable ink or coating composition further comprises an aminoacrylate derived from the Michael reaction of a polyacrylate and ethanolamine.

11. The method of claim 1, wherein the energy curable ink or coating composition further comprises at least one monomer having as part of its structure a poly(ethylene oxide) subunit where the average degree of ethoxylation is greater than or equal to 2.

12. The method of claim 1, wherein the amount of migration of uncured monomer out of the cured composition is less than or equal to 50 parts per billion of each monomer.

13. The method of claim 1, wherein the accelerating voltage of the electron beam emitter is between 70 keV and 200 keV.

14. The method of claim 1, wherein the cure dose is greater than or equal to 40 kGy.

15. The method of claim 1, wherein the cure dose is between 70 kGy and 200 kGy.

16. The method of claim 1, wherein the energy curable ink or coating composition is an inkjet ink or coating.

17. A printed substrate prepared by the method of claim 1.

18. The printed substrate of claim 17, wherein the substrate is selected from a plastic film, a plastic laminate, and a plastic-paperboard laminate.

19. A food packaging article comprising the printed substrate of claim 17.

* * * * *